Aug. 21, 1928.
G. E. HALLENBECK
1,681,402
DRILL PRESS
Filed Dec. 15, 1919      2 Sheets-Sheet 1
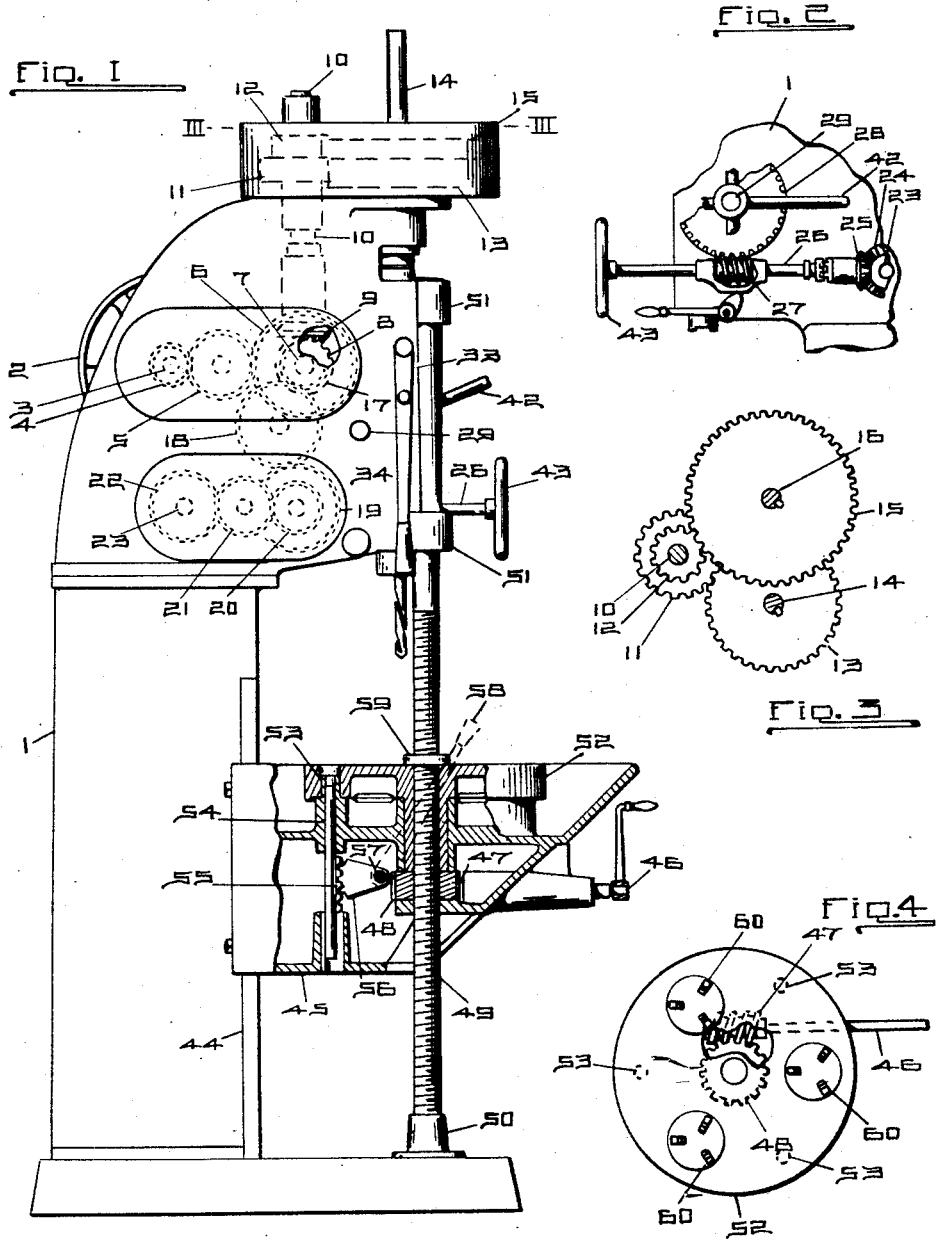
Inventor Aug. 21, 1928.
G. E. HALLENBECK
1,681,402
DRILL PRESS
Filed Dec. 15, 1919      2 Sheets-Sheet 2
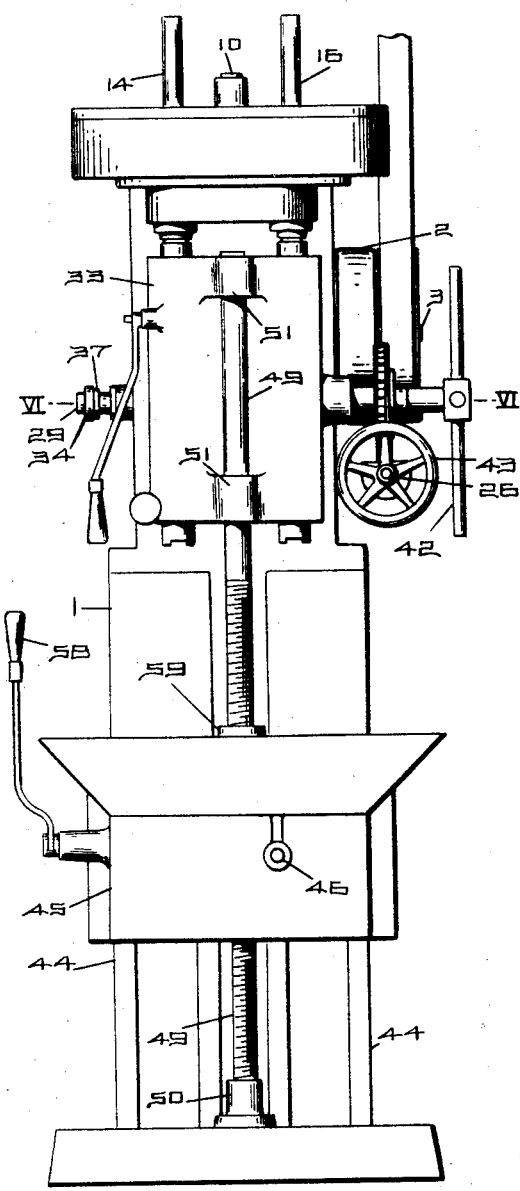
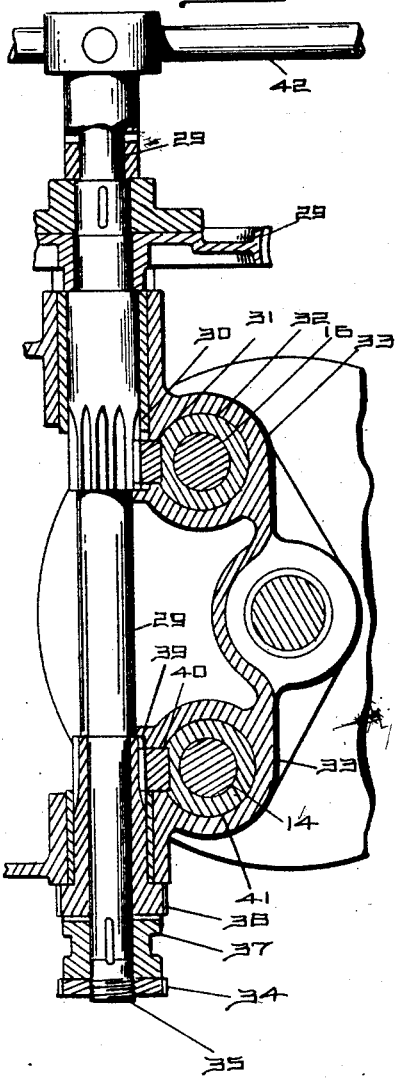
Geo E Hallenbeck
Inventor
By Geo E Kirk
Attorney Patented Aug. 21, 1928.

1,681,402

UNITED STATES PATENT OFFICE.

GEORGE E. HALLENBECK, OF TOLEDO, OHIO, ASSIGNOR, BY MESNE ASSIGNMENTS, TO BAKER BROTHERS, INC., OF TOLEDO, OHIO, A CORPORATION OF OHIO.

DRILL PRESS.

Application filed December 15, 1919. Serial No. 344,818.

This invention relates to machine tools, more particularly as to tool and work holding devices therefor.

This invention has utility when incorporated in drill presses as twin rotary holders with coacting adjustable tables.

Referring to the drawings:

Fig. 1 is a side elevation, with parts broken away, of an embodiment of the invention in a drill press;

Fig. 2 is a fragmentary detail view of the feed drive;

Fig. 3 is a section on the line III—III, Fig. 1, looking in the direction of the arrow;

Fig. 4 is a plan view of the table;

Fig. 5 is a front view of the drill press of Fig. 1; and

Fig. 6 is a section on the line VI—VI Fig. 5.

There is shown a drill press frame 1. A driving pulley 2 actuates shaft 3 in this frame 1. On this shaft 3 is pinion 4, an intermediate gear 5 of a change speed gear train is in mesh with the pinion 5 and a gear 6 on shaft 7. This shaft 7 has bevel gear 8 in mesh with bevel pinion 9 on upwardly extending shaft 10. The shaft 10 near its upper end carries a pair of gears 11, 12, one below the other. The lower gear 11 is shown as in mesh with a gear 13, Figs. 1 and 3, splined to vertical spindle 14. Companion gear 12 on the shaft 10 is in mesh with gear 15 on vertical spindle 16, parallel to the spindle 14 as well as parallel to the shaft 10. There is accordingly in the frame 1 a pair of vertical parallel drill spindles 14, 16.

From the shaft 7 there may be the feed drive for spindle reciprocation as distinguished from this rotary or actuating drive of the spindles 14, 16. This feed drive is actuated from the shaft 7 by a gear 17 thereon in mesh with gear 18 carried in the frame. This gear 18 is in mesh with a gear 19 on a shaft fixed with a gear 20 in mesh with a gear 21. This gear 21 is an intermediate gear in a change speed gear train and is in mesh with gear 22 on shaft 23. This shaft 23 carries a bevel gear 24, Fig. 2, in mesh with bevel pinion 25 on shaft 26 carrying a worm 27 in mesh with worm wheel 28 on the feed shaft 29. This feed shaft 29, Fig. 6, has formed thereon a pinion 30 in mesh with rack 31 fast with sleeve 32 about the drill spindle 16 mounted in fixed sleeve 33 of the frame 1.

The remote end of this feed shaft 29 carries nut 34, on threaded portion 35 of the shaft 29. This nut 34 is adjustable to release opposing jaw clutch member or sleeve 38 so it may be loose on the shaft 29 instead of rotatable therewith. This loose clutch member 38 carries pinion 39 in mesh with rack 40 carried by sleeve 41 about drill spindle 14. This non-rotary sleeve 41 is disposed for reciprocation in fixed sleeve 33 of the frame 1. Independent adjustment of the drill spindles 14, 16, may be readily effected. Spindle 14 may be set at a desired position, say in the coarser setting, by operating arms 42 on the shaft 29, or for more delicate adjustment by operating hand wheel 43 on the shaft 26. With such adjustment determined, the spindle 14 may be unclutched from the shaft 29 by backing off the lock nut 34 and thus slipping the clutch member 37 away from the clutch sleeve 38. This allows the shaft 29 to be rotated relatively to the pinion 39 for setting the pinion 30 and with it the drill spindle 16. When such independent setting of the spindle 16 has been accomplished, the nut 34 may be operated to lock the jaw clutch members 37, 38, together for common actuation from the shaft 29. However, the rotative speed between the spindles may be different as disclosed by the pairs of interchangeable driving gears between the respective spindles and the shaft 10.

The main frame 1 has vertical guides 44 for a base 45 adjustable by operation of shaft 46 carrying pinion 47 in mesh with gear 48 threaded on vertical column or member 49 fixed with the frame 1 by lower socket 50 and upper guides 51. These upper holding guides 51 are adjacent frame portion 33 of the frame 1 holding the spindles 14, 15, parallel with the threaded column or member 49. Concentrically mounted on this column or member 49 above the base 45 is a work table 52 having, on the under side thereof in a three position scheme of assembly as herein shown, three holes, or positioning determining seats 53. When the pair of tools is set for simultaneous working, one of the seats 53 may be entered by a vertically movable pin 54 having a rack 55 engaged by gear segment 56 on shaft 57, having counterweight handle 58 so that when this handle is thrown to bring the pin 54 into the table 52, its weight holds it in such locked position, while when the pin 54 is withdrawn by the handle 58, the pin is held withdrawn. The angular adjustment of the table 52 is effected by placing a removable handle on the shaft 46 and operating the shaft after first slightly lowering the table 52 away from the nut 59, so that there may not be frictional binding therewith. When the angular position is obtained, the elevating shaft 46 is operated to again bring the table 52 into clamped position against the nut 59 which as left at its determined adjusted position on the column 49, serves as an index. This clamp is a simultaneous locking to take up all lost motion between base 45 and table 52 as well as column 49, making a firm and positive anchoring for the entire holding structure of the table 52 at a quick simple adjustment with the threads on the column 49 having all looseness taken up from the gear 48 to the nut 59.

In the three position disclosure as herein brought out, the table 52 may be drilled to position work at three stations 60 thereon as shown in Fig. 4. With twin spindles as herein, there may be one idle station for removing finished stock and supplying new stock for work while one stage of tool operation may occur under spindle 14 and a second stage on the same work under spindle 16. Various numbers of stations even for simultaneous work upon different articles may be adapted to the device of this disclosure as well as more loading stations or idle stations as may be found desirable in practice.

In the device of this disclosure, there is a positive simple adaptation of a drill press for a wide range of operation in rapid performance for a large output of work which a single operator may readily handle. There is a positive fixing of the work and tool holders as to each other for maintaining alignment even under arduous work at high speed operation due to the coacting combination between the table structure and the drill spindle structure as herein disclosed.

What is claimed and it is desired to secure by Letters Patent is:

1. A machine tool comprising a frame having an overhanging portion, a drive, a driven shaft in said frame upwardly extending from said drive, a pair of tool spindle shafts parallel to and on opposite sides of said driven shaft, gearing from the driven shaft for rotating the spindle shafts from the driven shaft, and means for axially simultaneously reciprocating said spindles as to said gearing including a sleeve on each spindle and means permitting independent adjustment of said sleeves as to the frame.

2. A machine tool comprising a frame, driving means, a driven shaft upwardly extending from the driving means, a pair of tool spindle shafts parallel to and on opposite sides of said driven shaft, gearing from the driven shaft for actuating the spindle shafts from the driven shaft, in said frame bearing sleeves for the spindles, adjusting means connectible for independently or simultaneously adjusting said sleeves as to said frame, and feeding means for reciprocating said sleeves as to said frame axially of said spindle.

3. A machine tool comprising a frame, driving means, a driven shaft upwardly extending from the driving means, a pair of sleeves in said frame parallel to the driven shaft, said sleeves having racks, sleeve adjusting means for reciprocating said spindles including a shaft, pinions in mesh with said racks, and means for disconnecting a pinion from said shaft whereby the spindles may be independently adjustable by rotating one pinion relatively to the other, a tool spindle shaft in each sleeve, and gearing from the driven shaft for rotating the spindles.

4. A machine tool comprising a frame having a pair of parallel driven spindles, driving means for the spindles including a shaft parallel to the spindles, and spur gears on said shaft and spindles, non-rotary bearing sleeves for the spindles, a feed shaft for the pair of spindles connected to the said sleeves, and means for disconnecting the said feed shaft from one of the sleeves for independently setting a spindle.

5. In a machine tool comprising a frame, a rotary table mounted in said frame, the combination of a driven shaft housed in the frame, a pair of spindles rotatable from said shaft, bearing sleeves about said spindles reciprocable in the frame for feeding said spindles toward said table, and a column mounted in the frame below the table and extending axially of the table to the frame above the table between said spindles and on the side thereof remote from said driven shaft, said sleeves being on opposite sides of said column spaced from the driven shaft independent of said column.

In witness whereof I affix my signature.

GEO. E. HALLENBECK.